United States Patent [19]

Baier et al.

[11] 4,324,389
[45] Apr. 13, 1982

[54] DEVICE FOR SCARFING THE SURFACE OF A METAL WORKPIECE

[75] Inventors: Alfred Baier, Kronberg; Alfred Pfeuffer, Neu-Isenburg, both of Fed. Rep. of Germany

[73] Assignee: Messer Griesheim GmbH, Frankfurt am Main, Fed. Rep. of Germany

[21] Appl. No.: 258,674

[22] Filed: Apr. 29, 1981

[30] Foreign Application Priority Data

May 16, 1980 [DE] Fed. Rep. of Germany ....... 3018648

[51] Int. Cl.³ .......................... B23K 7/06; B23K 7/08
[52] U.S. Cl. ...................................... 266/51; 266/74; 266/75
[58] Field of Search ............................ 266/74, 75, 51

[56] References Cited

U.S. PATENT DOCUMENTS

| | | | |
|---|---|---|---|
| 2,414,510 | 1/1947 | Doyle | 266/75 |
| 3,455,747 | 7/1969 | Lytle | 266/74 |
| 3,856,282 | 12/1974 | Lucht | 266/75 |
| 4,103,877 | 8/1978 | Pfeuffer | 266/75 |

*Primary Examiner*—W. Stallard
*Attorney, Agent, or Firm*—Connolly and Hutz

[57] ABSTRACT

A scarfing device includes a powder supply apparatus having a plurality of discharge nozzles controlled by a shutoff valve and includes at least one extra scarfing nozzle associated with one of the powder discharge nozzles.

5 Claims, 4 Drawing Figures

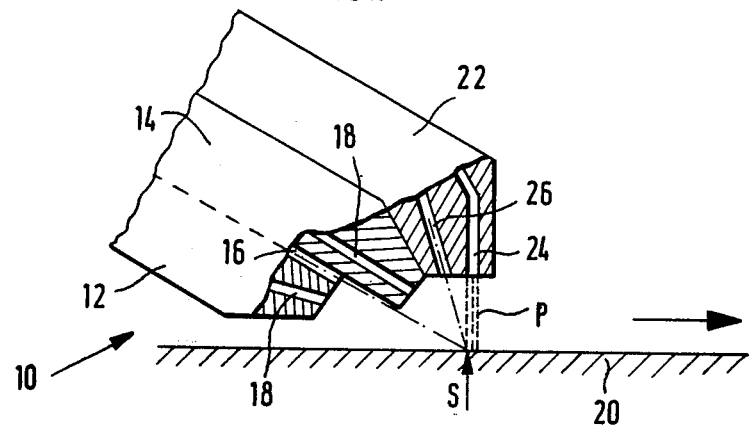
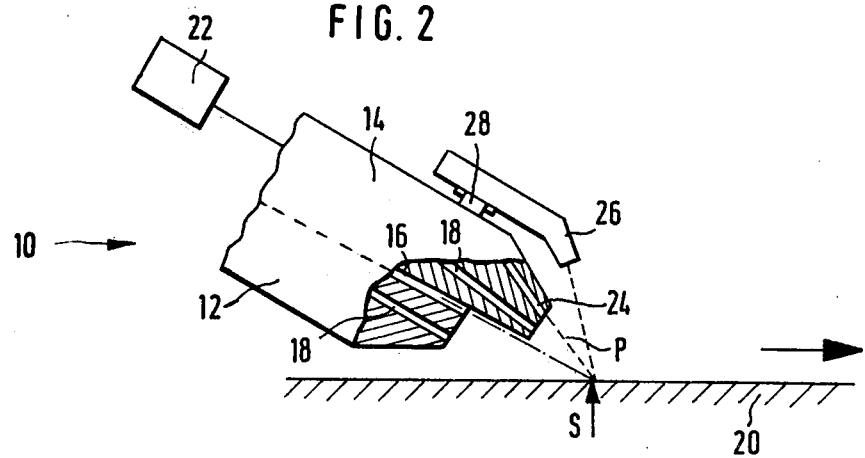

DEVICE FOR SCARFING THE SURFACE OF A METAL WORKPIECE

BACKGROUND OF INVENTION

A device known from German Patent DE-PS 16 21 671 has an extra scarfing nozzle which is arranged on a full width scarfing torch. Either a portion of the surface can be selectively scarfed in addition at the same time with this extra scarfing nozzle which is an advantage, for example, for deeper defects, or only individual defective spots are scarfed by the extra scarfing nozzle. The full width scarfing torch is adjusted in the latter case to a "scarfing value" in such a way that the full width scarfing oxygen stream only sustains one melting bath which makes the scarfing startup for this selective scarfing possible. As a result, metal powder as a startup aid is not necessary.

The use of metal powder as a scarfing startup aid is known. As is evident from German Pat. No. DE-PS 10 16 102, a powder supply apparatus is associated with a scarfing torch consisting of a large number of individual nozzles. This apparatus consists of a supply bin from which the powder arrives at a distributor and which supplies the powder each time to a powder discharge nozzle via several pipelines, in other words, each pipeline is connected to its own nozzle.

A device for scarfing the material surface in accordance with the general type of arrangement with which this invention is concerned is disclosed in German Preliminary Published Application No. 25 53 553. This known device has a wide scarfing oxygen channel and is equipped with an additional nozzle for extra scarfing oxygen as well as with a separately provided powder nozzle.

SUMMARY OF INVENTION

An object of the present invention is to design an improved device of the above type in such a way that a localized ignition procedure on the workpiece surface can be achieved, preferably also on random spots.

In order to meet this object, it is proposed according to the invention that the powder supply apparatus have several discharge nozzles having pipelines connected to a supply bin, in each of which a shutoff valve is provided and that, furthermore, the extra scarfing nozzle be associated with one of these powder discharge nozzles.

It is advantageous in a preferred embodiment of the invention when the extra scarfing nozzle is provided laterally adjustable on the surface of the device. This has the advantage that ignition is possible at different spots of the workpiece surface (but within the given scarfing torch width) since in this case only the appropriate powder discharge nozzle must be actuated and the corresponding extra scarfing nozzle must be aligned with this powder discharge nozzle. Lateral adjustability advantageously signifies here a lateral movement of the nozzle on the device (in other words, at right angles to the scarfing direction) as well as a swinging of the nozzle whereby the nozzle is arranged in the latter case centrally on the device and has a swing path to both sides which is sufficiently large to cover an adequately large area of the workpiece surface.

As a result of the advantageous arrangement of shutoff valves in the powder supply pipelines, it is possible in connection with the extra scarfing nozzle to align the extra scarfing nozzle with the appropriate defect in the workpiece surface in the area of the scarfing torch and to simultaneously turn on the appropriate discharge nozzle of the powder supply apparatus associated with this defect by opening the corresponding valve while the valves for the other nozzles remain closed. Scarfing powder (iron powder) is advantageously only applied where it is necessary for the rapid scarfing startup with the extra scarfing nozzle.

It is, moreover, advantageously provided in a further embodiment that each extra scarfing nozzle is associated with a discharge nozzle and that the shutoff valve of each discharge nozzle can be actuated together with the shutoff valve of the corresponding extra scarfing nozzle. This variant is advantageous when several extra scarfing nozzles are associated with the scarfing torch, which can be actuated selectively depending on the location of the defect. The powder is correspondingly discharged at the same time from the appropriate powder discharge nozzle when the valve is opened whereas the other shutoff valves (for the other extra scarfing nozzles, respectively, the remaining powder discharge nozzles) remain closed.

THE DRAWINGS

FIGS. 1-2 are elevation views partly in section schematically illustrating different embodiments of the invention; and FIGS. 3-4 are plan views schematically illustrating different embodiments of the invention.

DETAILED DESCRIPTION

Figure 3:
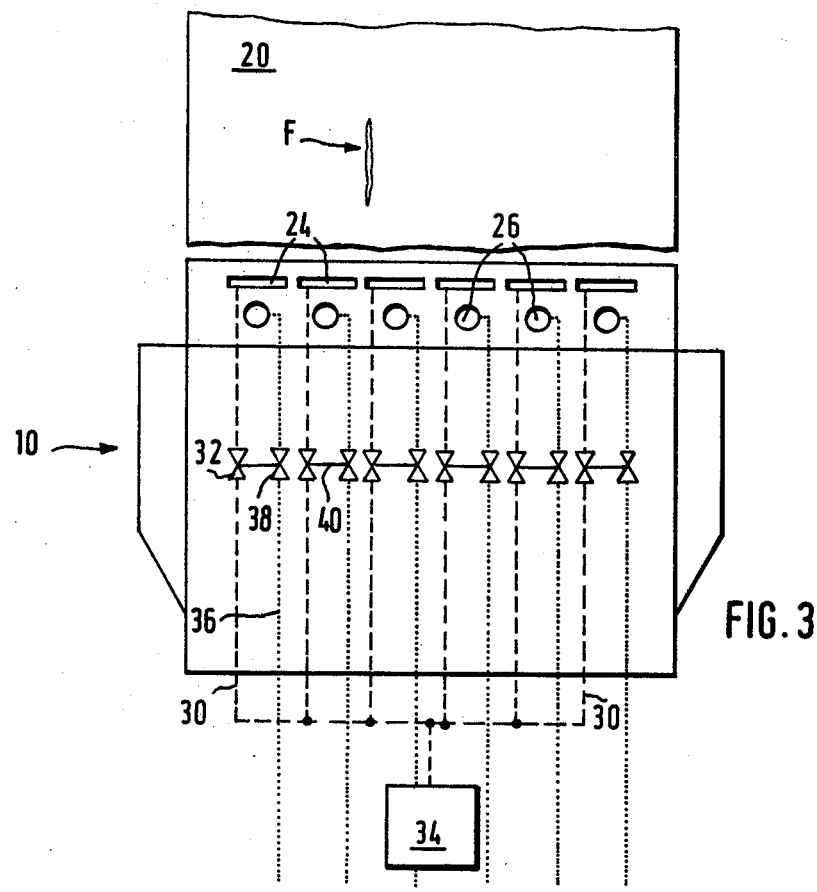

FIG. 1 shows the scarfing device in partial cross section and a scarfing torch 10 shown simplified. This scarfing torch 10 has a lower and an upper preheating block 12 and 14, respectively, with the slot-shaped scarfing oxygen channel 16 formed in between. Nozzles 18 are, furthermore, provided in the preheating blocks from which a fuel gas-burning oxygen mixture (ready-mixed gas or mixed on location) which forms the preheating flames is discharged to heat up the workpiece 20 to be scarfed.

It can be seen that a powder supply apparatus 22 is fastened to the upper preheating block 14. This apparatus has several discharge nozzles 24 (see also FIGS. 2-4) from which metal powder (iron powder) flows as an auxiliary agent for a rapid scarfing startup on the surface of the workpiece 20 to be scarfed as shown in dotted lines (P) in FIGS. 1 and 2.

It is possible to scarf the entire surface of the workpiece 20 with the scarfing torch 10 shown in the drawing whereby the number of scarfing paths necessary for the entire surface is a function of the width of the scarfing torch, especially of the scarfing oxygen channel 16.

In order to also scarf selectively, in which the scarfing torch 10 is inefficient as a result of its operating width, one or more extra scarfing nozzles 26 are, furthermore, provided.

This extra scarfing nozzle can be integrated in the powder supply apparatus 22 as shown in the embodiment of FIG. 1 or can be arranged as a separate component on the scarfing torch 10 as shown in FIG. 2. In the case of FIG. 2, it is, furthermore, especially advantageous to provide the powder supply apparatus, especially its nozzles 24, in the upper preheating block 14 and to arrange the actual powder supply apparatus 22 separately, as illustrated schematically.

The extra scarfing nozzle 26 of FIG. 2 can be arranged fixed or adjustable, depending on the need, on the scarfing torch 10. It is possible within the framework of an adjustable arrangement to support the extra scarfing nozzle 26 in such a way that it can swing around a point of rotation whereby the swinging path to the left and to the right is dimensioned in such a way that a workpiece width which corresponds at least to the width of the scarfing torch 10 is covered. It is, of course, possible as an alternative and thus within the scope of the invention to slideably arrange the extra scarfing nozzle 26 on a guide track 28 fastened to the scarfing torch 10 whereby the movement of the extra scarfing nozzle into the desired position can take place by means of a pneumatic cylinder (not shown).

FIG. 3 shows the schematic arrangement of several discharge nozzles 24 and a corresponding number of extra scarfing nozzles 26. It can be seen that each extra scarfing nozzle 26 is thereby associated with a discharge nozzle 24. The powder discharge nozzles 24 are connected to a supply bin 34 via pipelines 30 in which shutoff valves 32 are provided. Components 24, 30, 32 and 34 form in this case the powder supply apparatus 22. The extra scarfing nozzles are correspondingly also connected with the gas supply (not shown) for the scarfing torch via pipelines 36 in which also shutoff valves 38 are arranged. Each of the shutoff valves 32 and 38 can be controlled separately; it is, however, advantageously possible as shown in FIG. 3 to jointly control each pair of shutoff valves 32, 38 associated with a pair of nozzles 24, 26 as illustrated by the connection 40. The appropriate pair of valves 32, 38 is then preferably controlled in such a way that first the shutoff valve 32 opens and iron powder flows from the discharge nozzle 24 and arrives in the preheating flames for the purpose of a rapid heating up of spot S to be scarfed on the workpiece 20. After achieved, heating of spot S to the ignition temperature, the shutoff valve 38 then opens delayed and supplies the scarfing oxygen to extra nozzle 26 so that the actual scarfing can be started. This procedure: opening of the shutoff valve 32, heating up of spot S to ignition temperature, opening of shutoff valve 38 for the extra scarfing oxygen (for selective scarfing) takes about one second maximally.

When selectively scarfing the surface of the workpiece, when operating, therefore, only with the extra scarfing nozzle 26, the operator only has to select the correct pair of nozzles 24, 26 opposite the defect F; in FIG. 3 this would be the third pair of nozzles 24, 26 from the left.

Figure 4:
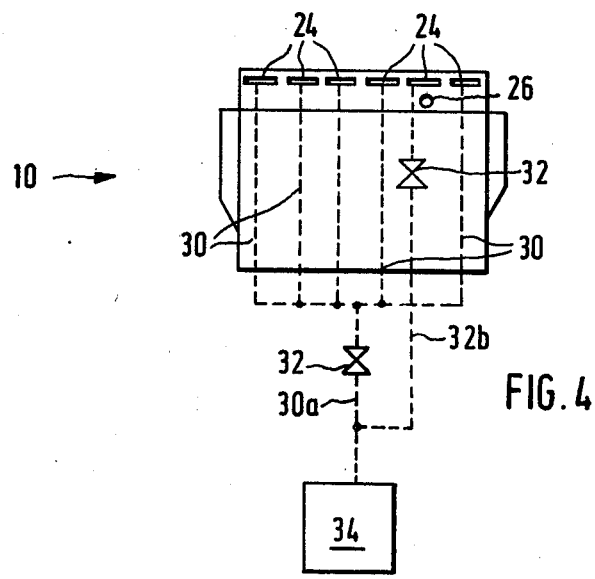

A further advantageous embodiment of the invention is shown in FIG. 4. It can be seen that only one single fixed extra scarfing nozzle 26 is provided. In order to selectively scarf with the scarfing torch 10 with the fixed arrangement of the extra scarfing nozzle, it is necessary to proceed only until the extra scarfing nozzle 26 is in the area of the defect F. In order to prevent powder from flowing from all discharge nozzles 24 for the selective scarfing startup, the pipelines 30 are interconnected and exit in a common supply line 30a in which the shutoff valve 32 is provided. An additional pipeline 32b branches off, however, before this shutoff valve 32, which is exclusively connected with the discharge nozzle 24 associated with the extra scarfing nozzle 26. If necessary, a shutoff valve 32 may also be provided in this additional pipeline 32b, which then opens delayed with the shutoff valve (not shown) for the extra scarfing nozzle.

It is advantageously possible with the scarfing torch 10 according to the invention to scarf the entire surface (via the scarfing oxygen channel 16) as well as selectively by means of the extra scarfing nozzle 26 whereby for a rapid scarfing startup, those discharge nozzles 20 of the powder supply apparatus 22 are always in operation which are exactly needed, in other words, all nozzles for full surface scarfing, for selective scarfing each time only those discharge nozzles 24 which are directly associated with the extra scarfing nozzle 26 which is in operation at the time. A metered discharge of the scarfing powder needed for a rapid scarfing startup takes place in this way in an advantageous way, and, to be sure, targeted only where this scarfing powder is indeed required whereas the other powder discharge nozzles where scarfing does not take place remain closed.

What is claimed is:

1. In a device for scarfing the surface of a metal workpiece, consisting of an upper and lower preheating block arranged at a distance from each other with a scarfing oxygen channel formed therebetween, and with an extra scarfing nozzle which can be actuated by a shutoff valve as well as with a powder supply apparatus associated with the device, the improvement being said powder supply apparatus having a plurality of discharge nozzles connected by pipelines to a supply bin, shutoff valve means associated with said pipelines, and at least one extra scarfing nozzle associated with one of said powder discharge nozzles.

2. Device according to claim 1, characterized in that said extra scarfing nozzle is provided laterally adjustable on top of the device.

3. Device according to claim 1, characterized in that said extra scarfing nozzle is arranged inside the upper preheating block.

4. Device according to claim 1, characterized in that siad extra scarfing nozzle is located in said powder supply apparatus.

5. Device according to claim 1, characterized in that one of said extra scarfing nozzles is associated with each of said discharge nozzles and said shutoff valve means comprising a shutoff valve associated with each of said discharge nozzles and actuated jointly with a shutoff valve associated with its corresponding extra scarfing nozzle.

* * * * *